United States Patent
Yu et al.

(10) Patent No.: US 9,698,914 B2
(45) Date of Patent: Jul. 4, 2017

(54) RECOVERING DATA FROM QUADRATURE PHASE SHIFT KEYING MODULATED OPTICAL SIGNALS

(71) Applicant: ZTE Corporation, Shenzhen (CN)

(72) Inventors: Jianjun Yu, Basking Ridge, NJ (US); Junwen Zhang, Morristown, NJ (US)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 14/781,554

(22) PCT Filed: Mar. 28, 2014

(86) PCT No.: PCT/CN2014/074328
§ 371 (c)(1),
(2) Date: Sep. 30, 2015

(87) PCT Pub. No.: WO2014/161445
PCT Pub. Date: Oct. 9, 2014

(65) Prior Publication Data
US 2016/0065313 A1    Mar. 3, 2016

Related U.S. Application Data

(60) Provisional application No. 61/806,869, filed on Mar. 30, 2013.

(51) Int. Cl.
*H04B 10/61* (2013.01)
*H04L 25/03* (2006.01)

(52) U.S. Cl.
CPC ......... *H04B 10/614* (2013.01); *H04B 10/612* (2013.01); *H04B 10/613* (2013.01); *H04L 25/0305* (2013.01); *H04L 2025/03636* (2013.01)

(58) Field of Classification Search
CPC ...... H04B 10/66; H04B 10/695; H04B 10/61; H04B 10/60; H04B 10/25133;
(Continued)

(56) References Cited

U.S. PATENT DOCUMENTS 5,970,093 A * 10/1999 de Lantremange ... H04L 7/0029
                                                  375/232
7,027,500 B1    4/2006 Casas et al.
(Continued)

FOREIGN PATENT DOCUMENTS

CN    1300477 A    6/2001
CN    101478350 A    7/2009
(Continued)

OTHER PUBLICATIONS

Xu et al., Decision Directed Least Radius Distance Algorithm for Blind Equalization in a Dual-Polarization 16-QAM System, Jan. 23, 2012, OFN/NFOEC Technical Digest, pp. 1-3.*
(Continued)

*Primary Examiner* — Ted Wang
(74) *Attorney, Agent, or Firm* — Perkins Coie LLP

(57) ABSTRACT

Systems, devices and techniques for processing received QPSK modulated optical signals include sampling the received signal at twice the baud rate, thereby producing samples that are then processed as 9-QAM symbols using a decision directed least squares optimization method. A third stage of channel equalization is filtering performs channel equalization to mitigate linear filtering effects along the transmission link. Data bits are then recovered from the resulting symbol estimates. The received optical signal may also include dual polarized signals for increased bandwidth capacity.

18 Claims, 21 Drawing Sheets

(58) Field of Classification Search
CPC .. H04B 10/614; H04B 10/612; H04B 10/613; H04L 25/0305; H04L 2025/03636
See application file for complete search history.

(56) References Cited

U.S. PATENT DOCUMENTS

| | | | |
|---|---|---|---|
| 7,835,259 | B1 | 11/2010 | Isaksen et al. |
| 8,311,417 | B1 | 11/2012 | Poggiolini et al. |
| 8,532,502 | B2 | 9/2013 | Zhang et al. |
| 2005/0129148 | A1 | 6/2005 | Isaksen et al. |
| 2009/0245816 | A1 | 10/2009 | Liu et al. |
| 2010/0014873 | A1 | 1/2010 | Bulow |
| 2012/0084619 | A1 | 4/2012 | Kuschnerov et al. |
| 2013/0136210 | A1* | 5/2013 | Khayrallah ....... H04L 25/03012 375/320 |
| 2013/0138375 | A1 | 5/2013 | Zhou et al. |
| 2013/0308960 | A1 | 11/2013 | Horikoshi et al. |
| 2014/0212132 | A1* | 7/2014 | Saito ................... H04L 25/03 398/25 |
| 2014/0233966 | A1 | 8/2014 | Yu et al. |

FOREIGN PATENT DOCUMENTS

| | | |
|---|---|---|
| EP | 1 251 690 A2 | 10/2002 |
| EP | 2 464 069 A2 | 6/2012 |
| JP | 2002-344822 A | 11/2002 |
| JP | 2012-124782 A | 6/2012 |
| WO | 99/46866 A1 | 9/1999 |
| WO | 2012/108421 A1 | 8/2012 |

OTHER PUBLICATIONS

Bosco, G., et al., "Performance Limits of Nyquist-WDM and CO-OFDM in High-Speed PM-QPSK Systems," IEEE Photonics Technology Letters, 22(15):1129-1131, Aug. 2010.
Chang, D., et al., "LDPC Convolutional Codes using Layered Decoding Algorithm for High Speed Coherent Optical Transmission," Optical Fiber Communication Conference, OSA Technical Digest (Optical Society of America), Paper OW1H.4, pp. 1-3, Mar. 2012.
Chien, H.-C., et al., "Performance Assessment of Noise-Suppressed Nyquist-WDM for Terabit Superchannel Transmission," Journal of Lightwave Technology, 30(24):3965-3971, Dec. 2012.
Dong, Z., et al., "7×224 Gb/s/ch Nyquist-WDM Transmission Over 1600-km SMF-28 Using PDM-CSRZ-QPSK Modulation," IEEE Photonics Technology Letters, 24(13):1157-1159, Jul. 2012.
Huang, B., et al., "Robust 9-QAM digital recovery for spectrum shaped coherent QPSK signal," Optics Express, 21 (6):7216-7221, Mar. 2013.
International Search Report and Written Opinion mailed on Jul. 4, 2014 for International Application No. PCT/CN2014/074328, filed on Mar. 28, 2014 (7 pages).
Kikuchi, K., et al., "Coherent Demodulation of Optical Quadrature Dubinary Signal with Spectral Efficiency of 4 bit/s/Hz per Polarization," 33rd European Conference and Exhibition of Optical Communication (ECOC), Berlin Germany, Paper 9.3.4, pp. 1-2, Sep. 2007.
Li, J., et al., "Approaching Nyquist Limit in WDM Systems by Low-Complexity Receiver-Side Duobinary Shaping," Journal of Lightwave Technology, 30(11):1664-1676, Jun. 2012.
Li, J., et al., "Building up low-complexity spectrally-efficient Terabit superchannels by receiver-side duobinary shaping," Optics Express, 20(9):10271-10282, Apr. 2012.
Liu, X., et al., "Transmission of a 448-Gb/s Reduced-Guard-Interval CO-OFDM Signal with a 60-GHz Optical Bandwidth over 2000 km of ULAF and Five 80-GHz-Grid ROADMs," National Fiber Optic Engineers Conference, OSA Technical Digest (CD) (Optical Society of America), Paper PDPC2, pp. 1-3, Mar. 2010.
Lyubomirsky, I., "Quadrature Duobinary for High-Spectral Efficiency 100G Transmission," Journal of Lightwave Technology, 28(1):91-96, Jan. 2010.
Machi, F., et al., "111-Gb/s PolMux-Quadrature Duobinary for Robust and Bandwidth Efficient Transmission," IEEE Photonics Technology Letters, 22(11):751-753, Jun. 2010.
Derder, M., et al., "Digital Filter and Square Timing Recovery," IEEE Transactions on Communications, 36 (5):605-612, May 1988.
Pfau, T., et al., "Hardware-Efficient Coherent Digital Receiver Concept With Feedforward Carrier Recovery for M-QAM Constellations," Journal of Lightwave Technology, 27(8):989-999, Apr. 2009.
Schmogrow, R., et al., "Real-time Nyquist pulse generation beyond 100 Gbit/s and its relation to OFDM," Optics Express, 20(1):317-337, Jan. 2012.
Selmi, M., et al., "Accurate Digital Frequency Offset Estimator for Coherent PolMux QAM Transmission Systems," 35th European Conference on Optical Communication (ECOC '09), Vienna, Austria, Paper P3.08, pp. 1-2, Sep. 2009.
Winzer, P.J., et al., "Generation and 1,200-km Transmission of 448-Gb/s ETDM 56-Gbaud Pdm 16-QAM using a Single I/Q Modulator," 2010 36th European Conference and Exhibition on Optical Communication (ECOC), Paper PDP2.2, pp. 1-3, Sep. 2010.
Xia, T.J., et al., "Field Experiment with Mixed Line-Rate Transmission (112-Gb/s, 450-Gb/s, and 1.15-Tb/s) over 3,560 km of Installed Fiber Using Filterless Coherent Receiver and EDFAs Only," Optical Fiber Communication Conference/National Fiber Optic Engineers Conference 2011, OSA Technical Digest (CD) (Optical Society of America), Paper PDPA3, pp. 1-3, Mar. 2011.
Yu, J., et al., "Field Trial Nyquist-WDM Transmission of 8×216.4Gb/s PDM-CSRZ-QPSK Exceeding 4b/s/Hz Spectral Efficiency," National Fiber Optic Engineers Conference, OSA Technical Digest (Optical Society of America), Paper PDP5D.3, pp. 1-3, Mar. 2012.
Yu, J., et al., "Transmission of 200 G PDM-CSRZ-QPSK and PDM-16 QAM With a SE of 4 b/s/Hz," Journal of Lightwave Technology, 31(4):515-522, Feb. 2013.
Zhou, X., et aL, "4000km Transmission of 50GHz spaced, 10×494.85-Gb/s Hybrid 32-64QAM using Cascaded Equalization and Training-Assisted Phase Recovery," National Fiber Optic Engineers Conference, OSA Technical Digest (Optical Society of America), Paper PDP5C.6, pp. 1-3, Mar. 2012.
Zhou, X., et aL, "400G WDM Transmission on the 50 GHz Grid for Future Optical Networks," Journal of Lightwave Technology, 30(24):3779-3792, Dec. 2012.
Zhou, X., et al., "8×450-Gb/s, 50-GHz-Spaced, PDM-32QAM transmission over 400km and one 50GHz-grid ROADM," Optical Fiber Communication Conference/National Fiber Optic Engineers Conference 2011, OSA Technical Digest (CD) (Optical Society of America), Paper PDPB3, pp. 1-3, Mar. 2011.
Zhou, X., et al., "High Spectral Efficiency 400 Gb/s Transmission Using PDM Time-Domain Hybrid 32-64 QAM and Training-Assisted Carrier Recovery," Journal of Lightwave Technology, 31(7):999-1005, Apr. 2013.

* cited by examiner

RECOVERING DATA FROM QUADRATURE PHASE SHIFT KEYING MODULATED OPTICAL SIGNALS

CROSS REFERENCE TO RELATED APPLICATIONS

This patent document claims the benefit of priority of U.S. Provisional Patent Application No. 61/806,869, filed on Mar. 30, 2013. The entire content of the before-mentioned patent application is incorporated by reference herein.

TECHNICAL FIELD

This patent document relates to optical communications and techniques for recovering data from optical signals.

BACKGROUND

With the advent of transmission of multimedia content such as video over the Internet and other communications networks, there is any ever-increasing need for increased data rate capacity on communication networks. Often, optical communication signals are used in backbones of communications network, where the increased traffic at the edges of the network aggregates to several gigabit of network traffic. Therefore, there is an increasing need for optical communication techniques to meet the demand on communications network data capacity. Laying down additional optical transmission media such as fiber optics often requires large amount of capital expenditure and may not always be a suitable options due to the expenses involved and other regulatory issues.

SUMMARY

This patent document provides, among others, techniques for recovering data from polarization modulated quadrature phase shift keying (PM-QPSK) signals, e.g., PM-QPSK signals that have undergone strong filtering during transfer from a transmitter to a receiver.

In one aspect, methods, apparatus and computer program products for recovering data in an optical communication system are disclosed. One example method includes receiving an optical signal that is modulated using polarized modulation quadrature phase shift keying (PM-QPSK) modulation scheme, sampling the received optical signal to generate a group of samples comprising samples at time instances that are odd integer multiples of T/2, where T represents a symbol time interval of the QPSK modulation scheme, estimating received constellation symbols from the group of samples using a decision-directed least radius distance (DD-LRD) algorithm for blind equalization, wherein the DD-LRD algorithm includes iteratively refining symbol estimates using an adaptive filter, and recovering data bits transmitted in the optical signal from the estimated constellation symbols. A third stage comprising an equalization filtering having a pre-determined number of coefficients (taps) is operated to mitigate degradations in the received signal due to the transmission link characteristics.

This and other aspects and their implementations are described in greater detail in the drawings, the description and the claims.

DETAILED DESCRIPTION

Figure 1A:
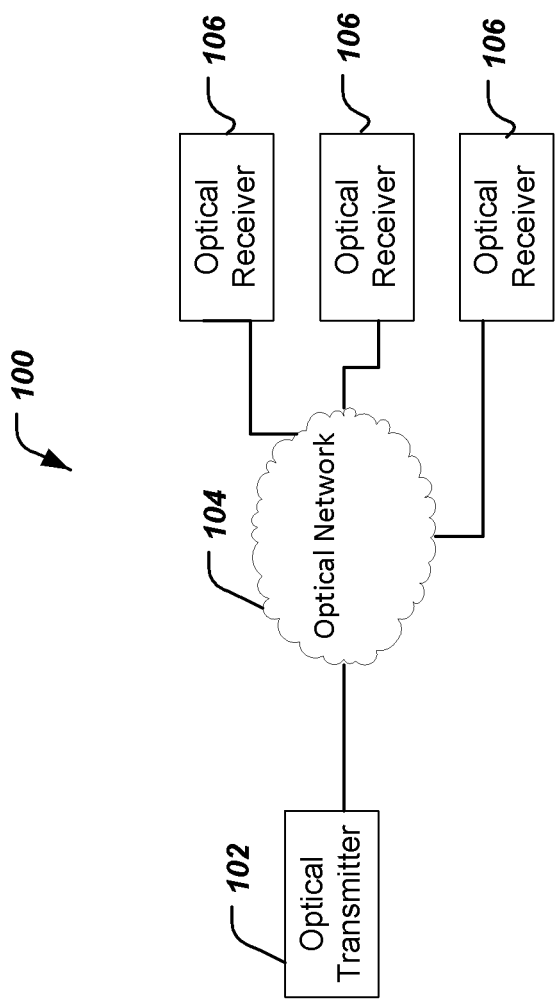
FIG. 1A is a block diagram of an optical communications system.

The techniques disclosed in the present document can be used to recover data from a Quadrature Phase Shift Keying (QPSK) modulated signal, even under severe filtering of the modulated signal. In the description below, the subject technology is disclosed using optical communication as an example. However, the disclosed techniques may be used in data recovery from any QPSK modulated signals. In the context of optical communications, the disclosed techniques can be used in embodiments of optical receivers such as optical trunk equipment used in Gigabit Ethernet, Synchronous Optical Networks (SONET), and other networks.

In some disclosed embodiments, a 9-QAM (Quadrature Amplitude Modulation) data recovery technique is used to process a portion of a received Polarization Modulated QPSK (PM-QPSK) signal in the presence of strong filtering. Strong filtering may occur, e.g., due to bandwidth limitation of the channel or due to bandwidth limitations in an intervening optical equipment such as a switch, or an optical front end used to receive the optically modulated data. As further discussed below, a decision-directed least radius distance (DD-LRD) algorithm for blind equalization can be used for 9-QAM recovery and inter-symbol interference (ISI) compensation. Simulation and tests have shown that the disclosed techniques are robust under strong filtering to recover a 9-QAM signal, instead of using traditional QPSK techniques only. To highlight certain features, results obtained after running an experiment on 112 Gb/s spectrum shaped PM-QPSK signal, corrupted by Wavelength Selective Switching (WSS) in a 25 GHz channel spacing Nyquist Wavelength Division Multiplexing (WDM), are provided. The final equalized signal is detected by Maximum Likelihood Sequence Detection (MLSD) for data bit error rate (BER) measurement. As will be discussed below, a 0.5 dB optical Signal to Noise Ratio (OSNR) tolerance improvement is obtained at a BER of $10^{-3}$ comparing to a traditional CMA plus post-filter algorithm.

In optical communication, signals occupying different polarization planes can be used to increase spectral efficiency. For example, a dual polarized signal could double the spectral efficiency (number of data bits transferred per second per Hertz). In some implementations, a Nyquist pulse is generated to achieve the Nyquist limit of spectral efficiency for a given baud rate. However the operating rate is limited by the speed of digital/analog converter (DAC). A partial response system gives the same high spectral efficiency at a cost of OSNR penalty due to its multilevel detection. Recently, a quadrature duobinary (QDB) has been proposed that approaches a spectral efficiency of 4 bit/s/Hz. A simpler and more realistic means is spectrum shaping based on the wavelength selective switch. A post-filter by a receiver-side duobinary shaping is used in order to apply conventional digital signal processing (DSP) schemes.

To recover data from received symbols, receivers often use timing synchronization to generate samples at integer multiples of time T, which represents the symbol period. The symbol samples are thus taken at the center of the symbol. However, when the received symbols have gone through aggressive or strong filtering, the data samples may suffer from intersymbol interference (ISI).

One approach to combat the ISI is to recover data by sampling at times that are integer multiples of T/2. Thus, even integer multiples of the sampling time instances fall on multiples of T and odd integer multiples of the sampling instances are in between adjacent symbols. Experiments and simulations performed by the present inventors have shown that the samples thus obtained show higher tolerance and robustness to the strong filtering. The constellation of the T/2 samples appears to be 9-QAM like for spectrum shaped QPSK signal. In some embodiments, a blind radius-directed equalizer (RDE) may be used to recover data from the 9-QAM like symbol spectrum. However this scheme is complicated because three constellation circles are considered. Also when the OSNR is lower (e.g., below 20 dB), it is difficult to separate three constellation circles at acceptable bit error rate (BER), as explained in greater detail below.

In some embodiments, a decision-directed least radius distance (DD-LRD) algorithm for blind equalization is used for 9-QAM recovery and ISI suppression. Experimental results with 112 Gb/s spectrum shaped polarization multiplexing-quadrature phase shift keying (PM-QPSK) signal with a 25 GHz bandwidth WSS in the Nyquist WDM (NWDM) channel are further discussed below. As described in the present document, the final equalized signal is detected by maximum likelihood sequence detection (MLSD) for data BER measurement.

FIG. 1A is a block diagram representation of an optical communication system 100 where the subject technology of this document can be implemented. An optical transmitter 102 transmits optical signals through an optical network 104 to one or more optical transceivers 106. The transmitted optical signals may go through intermediate optical equipment such as amplifiers, repeaters, switch, etc., which are not shown in FIG. 1A for clarity.

Figure 1B:
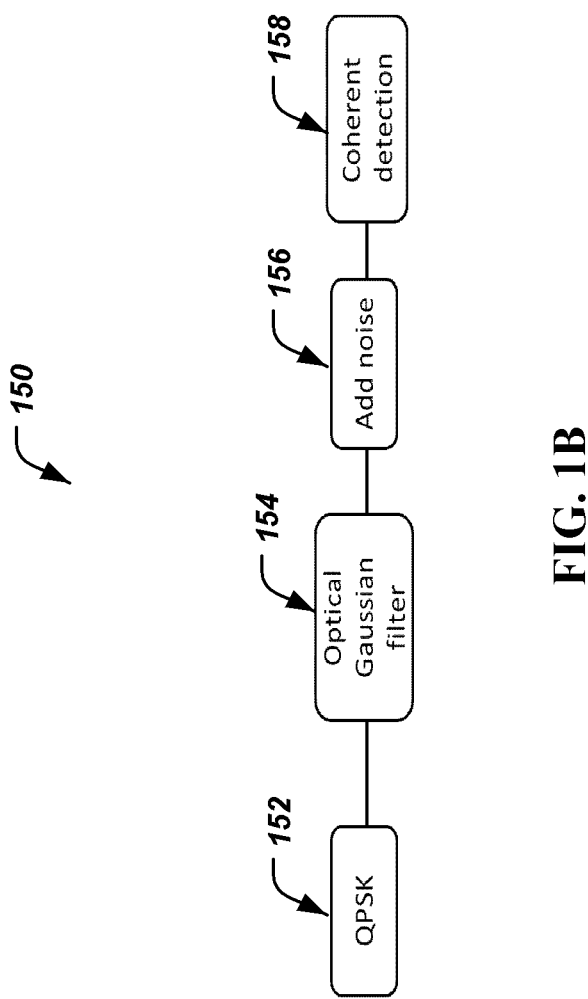
FIG. 1B is a block diagram example of an optical transmitter/receiver chain.

FIG. 1B illustrates an example of an optical processing chain 150 in which performance of the subject technology can be measured. A 28 Gbaud QPSK signal is generated by an I/Q modulator 152. Following this, an optical band-pass filter 154 of 4th order Gaussian type is utilized to shape the spectrum of QPSK signal. The 3 dB filter bandwidth of the filter 154 is emulated from 22 to 30 GHz in simulation, so that the spectrum is significantly compressed to approach Nyquist bandwidth. The amplified spontaneous emission (ASE) noise (emulated as Gaussian-distributed optical white noise) is added, at 156, before optical homodyne coherent detection 158. The signal OSNR is 30 dB which is defined in a 0.1 nm noise bandwidth. Both continuous wave (CW) laser sources in the transmitter and for local oscillator in coherent receiver are of practically zero Hz linewidth. The signal is sampled at the receiver side at twice the baud rate (symbol rate).

Figure 2:
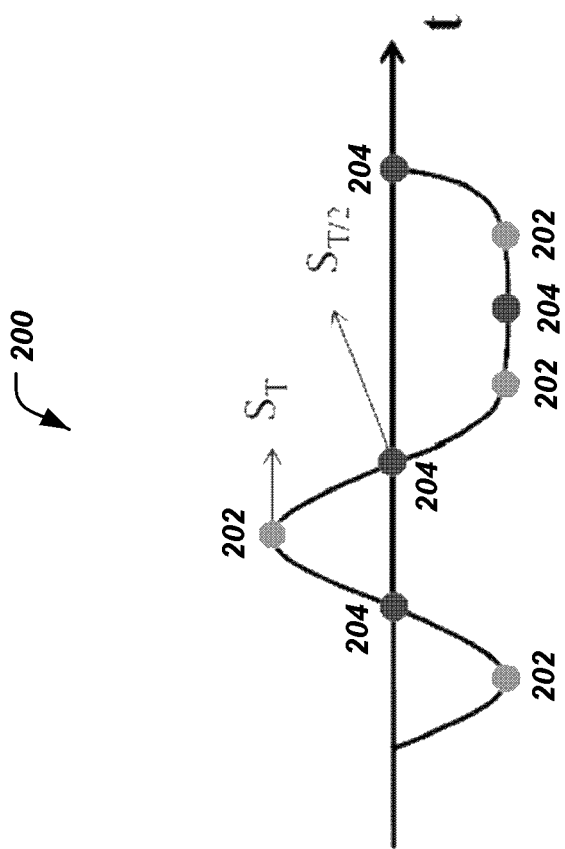
FIG. 2 shows a signal waveform that is sampled at multiples of T and T/2.

FIG. 2 depicts an example waveform 200 that illustrates two groups of samples. The sampled signal is divided into two groups: one is the signal sampled at the time of T, i.e., the timing phase is 0 radians (202), and the other is the signal sampled at the time of T/2, i.e., the timing phase is π/2 offset (204). The T samples are called $S_T$ and T/2 samples as $S_{T/2}$.

Figure 3:
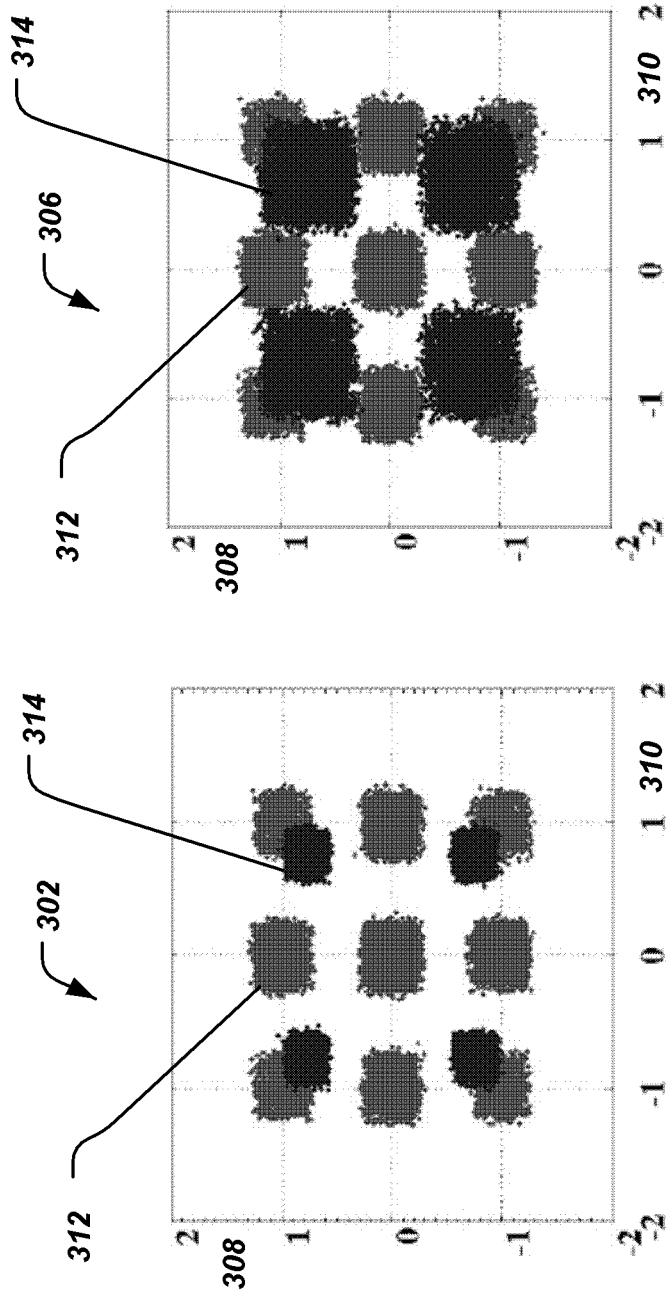
FIG. 3 depicts example constellations of a sampled optical QPSK signal with the filter of (a) 28 GHz and (b) 24 GHz bandwidth.

FIG. 3 shows the constellations of the received signal with the optical Gaussian filter of 28 GHz (302) and 24 GHz (306), plotted with horizontal axis 310 and vertical axis 308 representing possible data bit values. It may be seen that the constellations for the T samples are like 4-QAM (314) and T/2 samples are like 9-QAM (312). The effect by ISI after 4th order Gaussian filter can be seen in graph 306. It can be seen that each constellation point 312, 314 becomes a square-like distribution. Comparing 28 and 24 GHz filtering (graphs 302 and 306 respectively), the T samples 314 have much larger ISI when 24 GHz filter is applied, while the T/2 samples are nearly unchanged (312). In other words, a technique can recover the 9-QAM like $S_{T/2}$ samples instead of conventional processing to $S_T$ samples in the presence of strong filtering.

In some embodiments, when $S_T$ is given, $S_{T/2}$ can be estimated approximately by linear interpolation which is expressed as $$S_{T/2} = \frac{S_T(k) + S_T(k+1)}{2} (k = 1, 2, 3, \cdots) \quad (1)$$

In some implementations, a higher order lowpass filter may also be used for the above-discussed interpolation.

The symbol samples $S_{T/2}$ is a duobinary shaped signal and to some extent exhibits properties similar to that of a narrow bandwidth of the duobinary coded signal. Therefore T/2 samples have a greater filtering tolerance (compared to T samples) and a lower ISI due to the partial response nature of the system. However, because the constellation of the T/2 samples contains points closer to each other, higher OSNR is preferred than the corresponding T sample constellation, since multilevel detection is applied to the 9-QAM signal. In some implementations, the signal can be detected with MLSD algorithm which makes use of the inherent intersymbol memory and minimizes the number of error by selecting the most probable Trellis path.

In order to decrease the signal ISI, an adaptive finite impulse response (FIR) filter can be applied (e.g., a 9-tap filter). The CMA (constant modulus algorithm) is normally used to blindly update the FIR tap weights for the QPSK signal which has constant modulus. However, performance of CMA typically deteriorates with increase in ISI. A post-filter with 2 taps (i.e. one symbol delay and add), which performs the function of duobinary shaping, can be used to further combat the strong filtering limitation.

Figure 4:
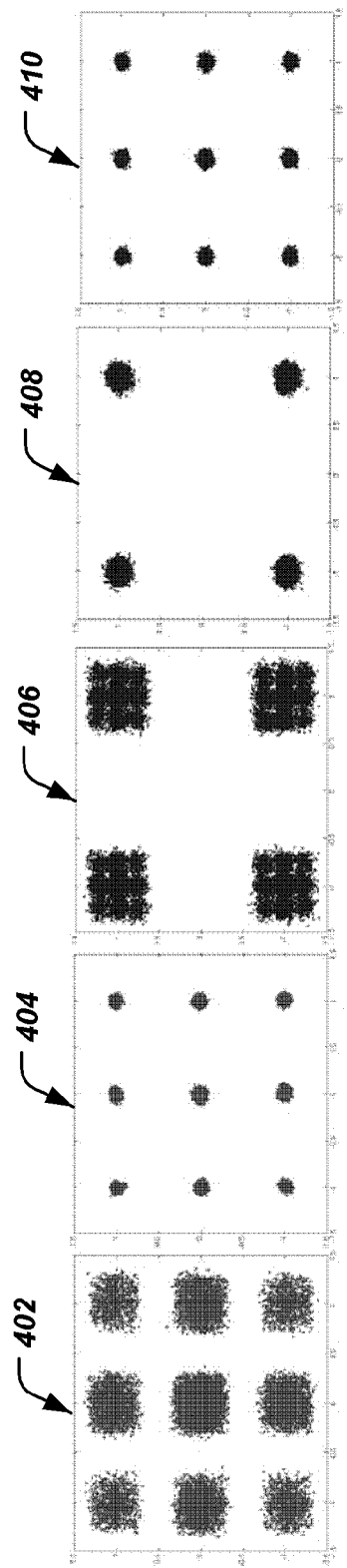
FIG. 4 depicts example constellations made up from (a) T/2 samples, (b) DD-LRD processing, (c) T samples, (d) constant modulus adaptation CMA processing, (e) CMA+post-filter processing.

With reference to FIG. 4, graph 406 shows example T samples suffering from severe ISI. Processing the constellation shown in graph 406 with CMA (408) and post-filter (410) can reduce the ISI to a certain degree. Graph 402 depicts T/2 samples and graph 404 depicts the T/2 samples after DD-LRD processing.

Alternatively, the 9-QAM T/2 samples can be recovered directly. CMA is not applicable in a straightforward manner to 9-QAM signals because 9-QAM signals do not have constant symbol amplitude and therefore error signal obtained by CMA cannot approach to zero. Instead, the DD-LRD algorithm can be used to update the filter tap weights which is much more accurate than CMA. The error function e(n) is given by $$e(n)=y(n)(|\hat{d}(n)|^2-|y(n)|^2), \quad (2)$$

where y(n) is the equalized signal, $\hat{d}$(n) is the decided symbol. The filter tap weights updating equalization is:

$$w(n)=w(n-1)+\mu e(n)x(n)^*, \quad (3)$$

where w(n) is the adaptive FIR filter, $\mu$ is the convergence parameter and * is the complex conjugation operation. The DD-LRD has a superior tolerance to ISI because of it is phase independent. Besides, DD-LRD has rapid convergence speed which is robust to time varying situation. The graph 402 shows the T/2 samples suffering from severe ISI. The DD-LRD algorithm presents excellent performance to reduce the effect of ISI, as shown in graph 404.

Figure 5:
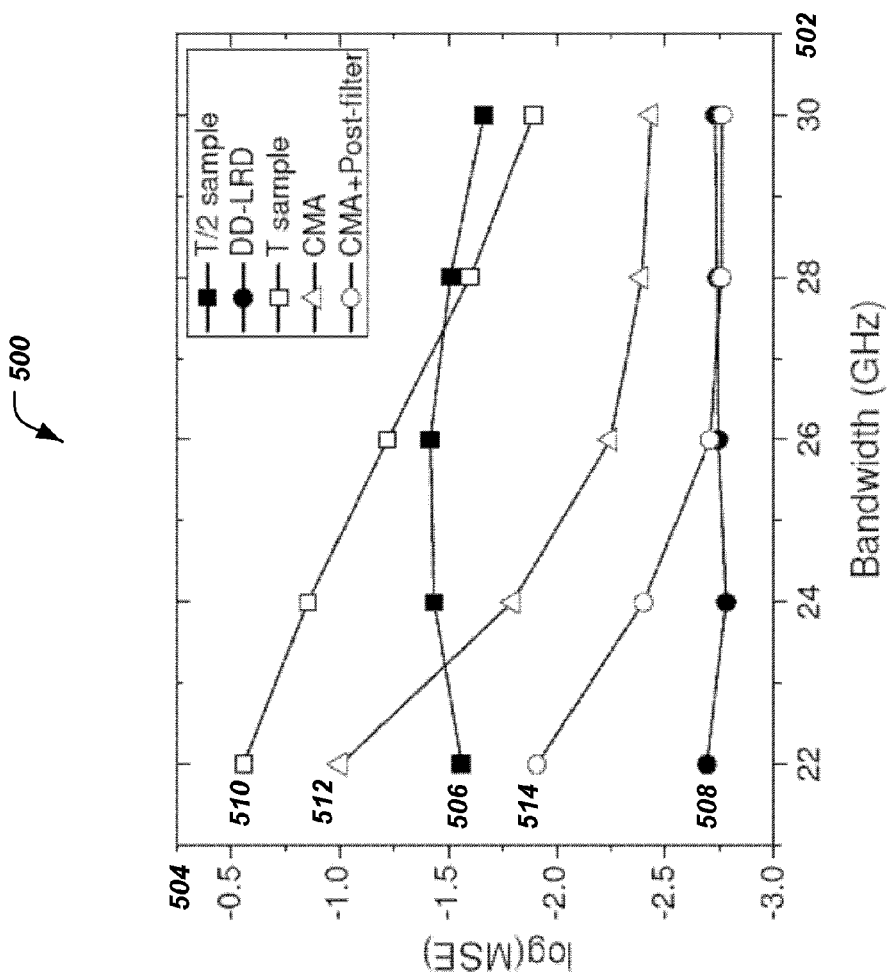
FIG. 5 is a graph depicting curves for measured MSE of the signals after T and T/2 sampling, DD-LRD, CMA, and CMA+post-filter processing.

FIG. 5 is a graph 500 that shows measured mean squared error (MSE), plotted on vertical axis 504, which is defined as:

$$\frac{1}{n}\sum_{i=1}^{n}(\hat{d}(i)-y(i))^2,$$

where n is the number of samples, obtained from the different digital signal processing algorithms discussed before, as a function of bandwidth, plotted on the horizontal axis 502. The curve 510 shows performance of T sample processing. The curve 512 performance of T sample processing when CMA is used. The curve 514 shows performance of T sample processing when both CMA and post-filtering are used. It can be seen that approximately 1 dB MSE improvement is obtained using CMA (512) comparing to T sampling signal (510) and further 0.5 dB is gained using post-filter with 26 GHz optical filtering (514). However filter bandwidth below 26 GHz (strong filtering) results in even more serious ISI. Therefore, MSE degrades rapidly as a function of narrower bandwidth (strong filtering) and the benefit of ISI compression from CMA decreases to less than 0.5 dB when the filter bandwidth is 22 GHz. The curves 506 and 508 present the processing to T/2 samples of the 9-QAM constellation. A 1.4 dB MSE improvement is obtained using DD-LRD (508) comparing to T/2 sampling signal (506). In one advantageous aspect, there is negligible change in the MSE performance as a function of filter bandwidth varying from 22 to 30 GHz. At wideband filtering (e.g., above 28 GHz), the performance of the DD-LRD I (508) is quite comparable to the CMA+post-filter algorithm (514). In other words, recovering data samples using 9-QAM signal instead of QPSK T samples is comparable is more robust to strong filtering and shows comparable performance at weaker filtering.

Figure 6:
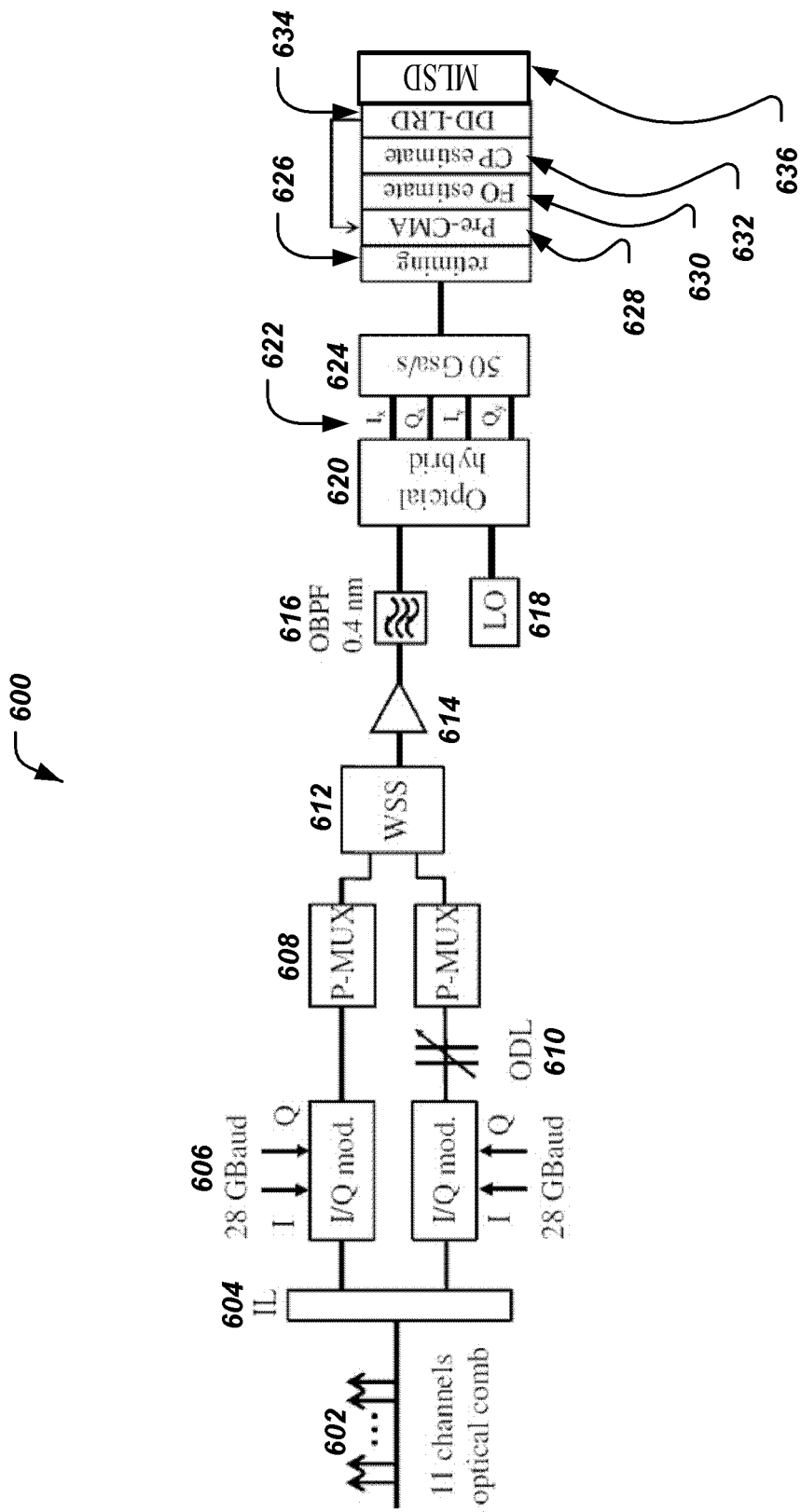
FIG. 6 is a block diagram representation of a wireless communications test bed.

FIG. 6 shows a test system 600 of 28 Gbaud Narrow Wavelength Division Multiplexing (NWDM) PM-QPSK with WSS spectrum shaping. The NWDM subchannels 602 are generated from a comb generator based on phase and intensity modulators with 25 GHz carrier spacing and equal tone power. The odd and even channels are separated by using a 25/50 GHz optical interleaver (IL) 604. The 28 Gb/s binary electrical signals are generated from the two channels pulse pattern generator (PPG) with a pseudorandom binary sequence (PRBS) length of $2^{11}-1$. The optical QPSK signal is generated using a commercial I/Q modulator 606. The polarization multiplexing is realized by the polarization multiplexer 608, which comprises a polarization maintaining coupler (PMC) to halve the signal, an optical delay line (ODL) to provide a delay of 150 symbols, and a polarization beam combiner (PBC) to recombine the signal. The even and odd channels are modulated and polarization multiplexed individually. After that, they are combined with 25 GHz channel spacing and the spectrum of each channel is shaped by a waveshaper (i.e., WSS) 612. A gain adjuster 614 is optionally used. The WSS was measured with 3-dB bandwidth of 21.6 GHz, 10-dB bandwidth of 30 GHz, and 20-dB bandwidth of 37.1 GHz. At the receiver, one tunable optical band-pass filter (OBPF) 616 with 3 dB bandwidth of 0.4 nm is employed to choose the measured subchannel. Polarization diversity homodyne detection is utilized at the receiver. The linewidth of external cavity lasers (ECL) at the transmitter and for local oscillator (LO) 618 at the receiver are both smaller than 100 kHz. A 50-GSa/s Analog/Digital conversion (ADC) 620 sampling is used in the Oscilloscope. The received data is then recovered by offline digital processed by a computer.

The received signal is resampled to 4 times symbol rate in order to process the timing phase estimation with square timing method (626). 2 samples/symbol is processed by cubic interpolation according to the right extracted clock. Four 17-taps T/2-spaced adaptive butterfly FIR filters are applied for polarization demultiplexing 628. The filters' weights are first updated by CMA for pre-convergence. The final adaptation is switched to DD-LRD 634 for precise feedback control. The adaptive FIR filter and DD-LRD in the meanwhile play a role of reducing the ISI and interchannel crosstalk. The frequency offset estimation (FOE) 630 is based on the fast Fourier transform (FFT) method and carrier phase estimation (CPE) 632 is based on blind phase search (BPS) algorithm. Finally the signal is detected by MLSD in use of intersymbol memory for data BER measurement (636). As a comparison, CMA plus post-filter scheme as well as MLSD detection is also evaluated.

Figure 7:
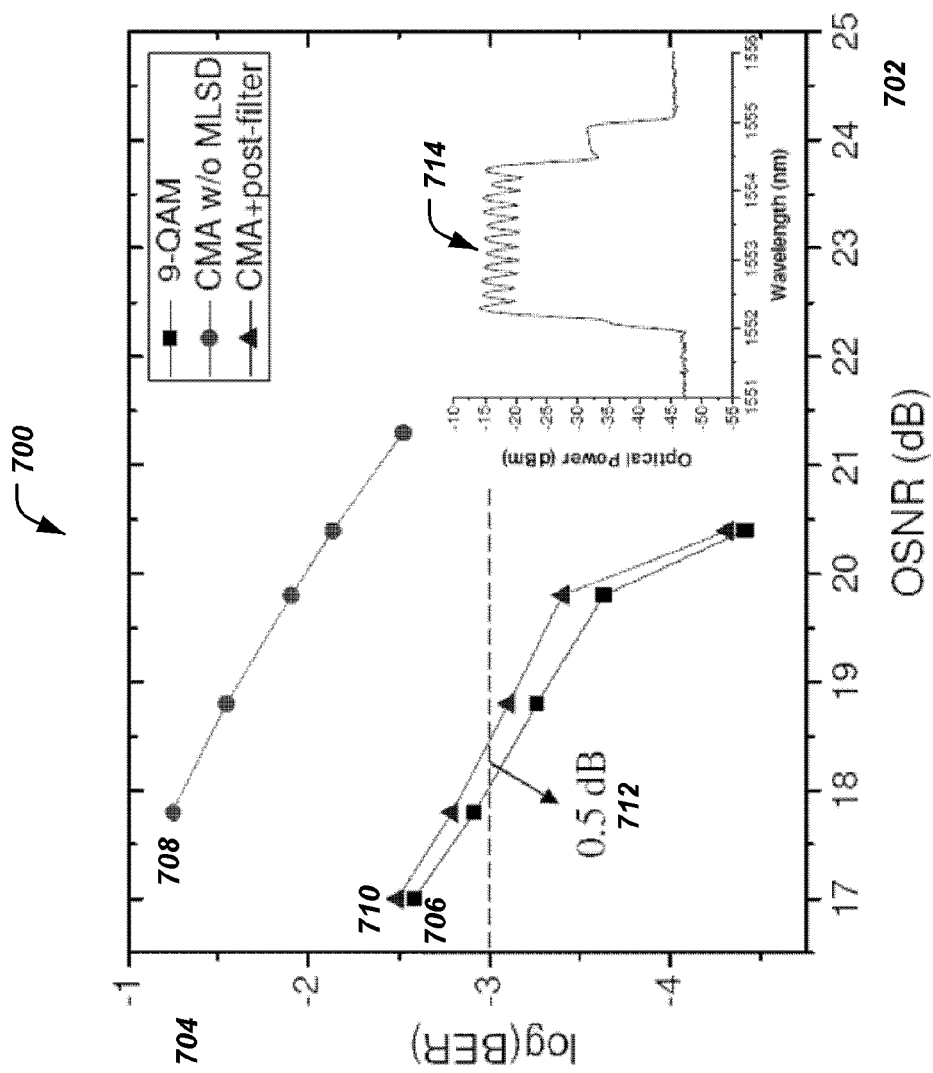
FIG. 7 is a graph depicting curves for measured BER as a function of OSNR (0.1 nm).

The measured BERs (vertical axis 704) based on different algorithms as a function of OSNR are shown in graph 700 of FIG. 7. The OSNR (horizontal axis 702) is measured in a 0.1 nm noise bandwidth. The data that is only processed with CMA (without MLSD decision) has poor performance due to the severe ISI (curve 708). This technique could not achieve $10^{-3}$ BER in our measurements.

Figure 8:
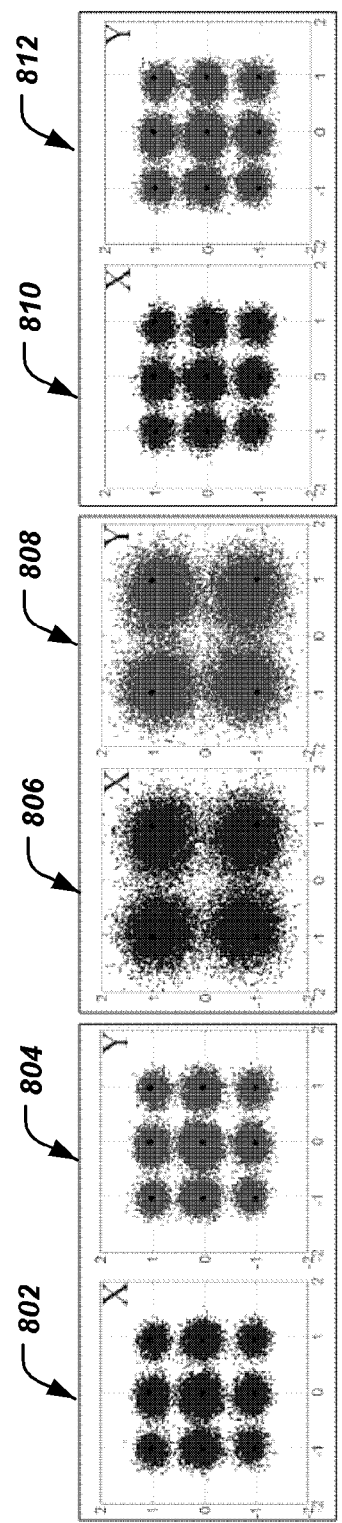
FIG. 8 depicts example constellations of the recovered signal using the algorithm of (a) 9-QAM digital processing, (b) standard CMA, (c) CMA+post-filter.

The ISI noise in graphs 806, 808 (X and Y polarization) of FIG. 8 is obviously visible in the graph. The OSNR for BER at $10^{-3}$ based on the above-discussed 9-QAM recovery algorithm is 18 dB (curve 706). The OSNR tolerance is 0.5 dB better than using CMA plus post-filter (curve 710). The constellations recovered from 9-QAM and CMA+post-filter methods are shown in FIG. 8, graphs 802, 804 (X and Y polarization) and 810, 812 (X and Y polarization) respectively.

The robustness to strong filtering and superiorly rapid convergence speed make the above-discussed 9-QAM digital recovery scheme more attractive and valuable for practical applications in optical networks.

Figure 9:
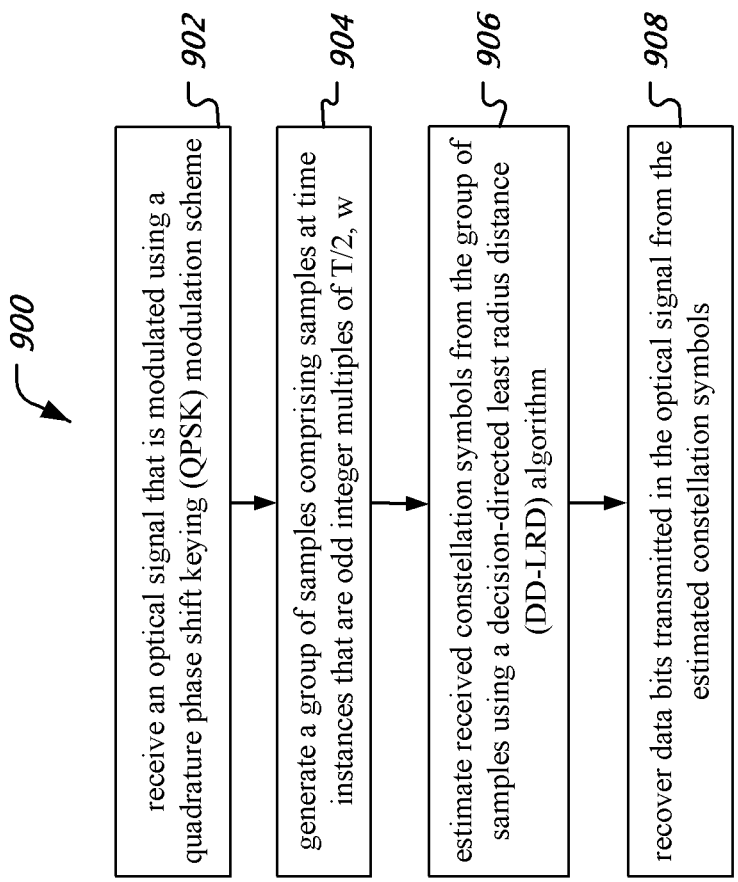
FIG. 9 is a flow chart representation of a process of optical communications.

FIG. 9 is a flowchart representation of a process 900 of optical communication by which data can be recovered in an optical receiver. At 902, an optical signal modulated using a quadrature phase shift keying (QPSK) modulation scheme is received. At 904, the received optical signal is sampled to generate a group of samples comprising samples taken at odd integer multiples of T/2, where T represents a symbol time interval of the QPSK modulation scheme. At 906, the received constellation symbols are estimated from the group of samples using a decision directed least radius distance (DD-LRD) algorithm for blind equalization. As previously described, the DD-LRD algorithm includes iteratively refining symbol estimates using an adaptive filter. At 908, data bits transmitted in the optical signal are recovered from the estimated constellation symbols.

As previously described, in some implementations, the constellation symbols are processed as 9-QAM symbols. In some implementations, the optical signal may include dual polarized QPSK signals. The dual polarizations may be orthogonal to each other (e.g., X and Y planes). In some implementations, the adaptive filter may comprise an FIR filter (e.g., the previously described 9-tap filter). In some implementations, the adaptive filter is iteratively refined using an LSE error criterion.

Figure 10:
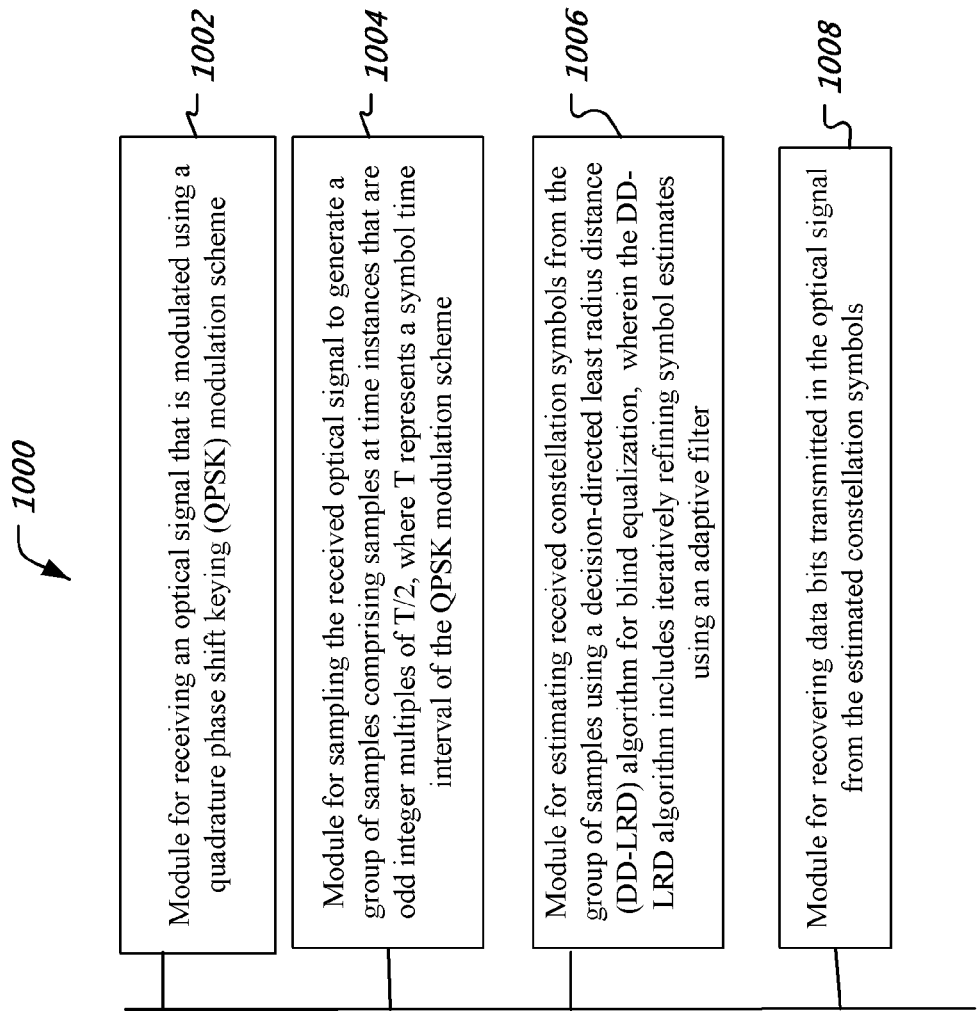
FIG. 10 is a block diagram representation of an apparatus for optical communications.

FIG. 10 is a block diagram representation of an optical receiver apparatus 1000. The module 1002 is for receiving an optical signal that is modulated using a quadrature phase shift keying (QPSK) modulation scheme. The module 1004 is for sampling the received optical signal to generate a group of samples comprising samples at time instances that are odd integer multiples of T/2, where T represents a symbol time interval of the QPSK modulation scheme. The module 1006 is for estimating received constellation symbols from the group of samples using a decision-directed least radius distance (DD-LRD) algorithm for blind equalization, wherein the DD-LRD algorithm includes iteratively refining symbol estimates using an adaptive filter. The module 1008 is for recovering data bits transmitted in the optical signal from the estimated constellation symbols. The apparatus 1000 and modules 1002, 1004, 1006, 1008 may further be configured to implement some of the techniques disclosed in this document.

In some embodiments, an optical communication receiver includes an optical front end that receives a polarized modulation quadrature phase shift keying (PM-QPSK) signal, a timing synchronizer that produces a sampling signal indicative of sampling instances at odd multiples of half of a baud rate of the received PM-QPSK, a signal sampler that produces sample values of the received PM-QPSK at the sampling instances, a symbol generator that estimates received symbols from the sample values using a decision directed adaptive filtering method in which decisions about received symbols are iteratively improved using a feedback signal indicative of an error of calculation of previous decisions, and a data recoverer that recovers data bits transmitted in the optical signal from the estimated received symbols.

Figure 11:
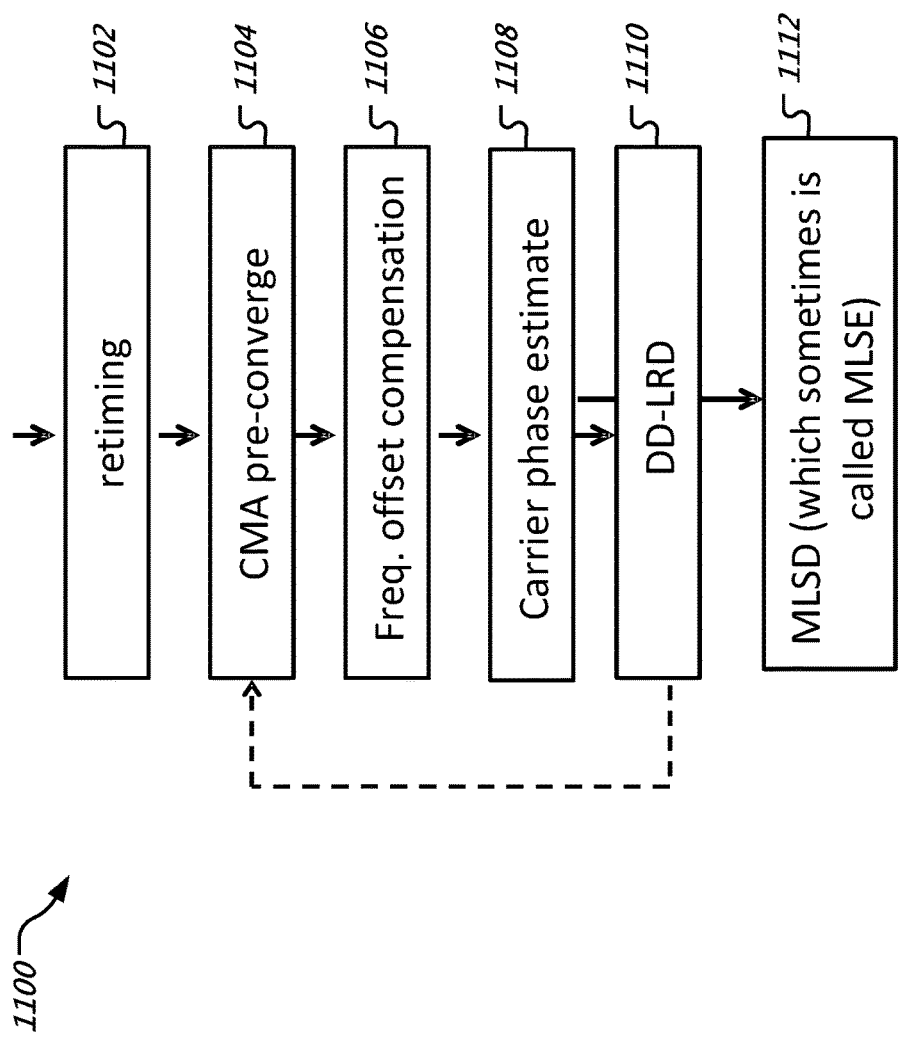
FIG. 11 is a flowchart representation of a digital signal processing technique.

FIG. 11 is a flowchart representation of a process 1100 of processing digital signals during the above-discussed data recovery procedures. At 1102, the previously described retiming may be performed to obtain sampling locations at odd multiples of T/2, using an estimated or a known baud rate of incoming signal. At 1104, the above-described constant modulus algorithm may be applied. Frequency offset compensation may be performed at 1106. Carrier phase estimation may be performed at 1106. The above-described DD-LRD estimation symbol estimation may be performed at 1108. Based on results obtained in 1108, a feedback may be provided to the CMA pre-convergence algorithm to refine the CMA step. Finally, at 1110, MLSE may be used to finalize symbol estimates from the 9 QAM constellation. In addition to, or in place of the algorithms described above, other methods such as the Gardner timing method for the retiming part may be used.

One of skill in the art will appreciate that a 9-QAM data recovery for PM-QPSK signal in presence of strong filtering to achieve Nyquist bandwidth is disclosed. In some embodiments, the DD-LRD algorithm for blind equalization is used for 9-QAM recovery and ISI compression. It will further be appreciated that the proposed techniques are robust under strong filtering to recover 9-QAM signal compared to the traditional QPSK data recovery techniques. It will further be appreciated that an experiment that includes a 112 Gb/s spectrum shaped PM-QPSK signal by WSS in a 25 GHz channel spacing Nyquist WDM shows the robustness of the disclosed technology. The final equalized signal is detected by MLSD for data BER measurement. 0.5 dB OSNR tolerance is improved at a BER of 10-3 comparing to CMA plus post-filter algorithm.

One of skill in the art will appreciate that the disclosed techniques are application to any communication system, and especially optical communication system, in which bandwidth efficiency approaching Nyquist limit (i.e., bandwidth of electrical signal close to 1/2 symbol rate and bandwidth of optical signal close to symbol rate) can be achieved by recovering transmitted symbols using T/2 located samples.

Examples of 9-QAM-Like Signal Generation, DSP Algorithms, and Experiment Setup

Figure 12:
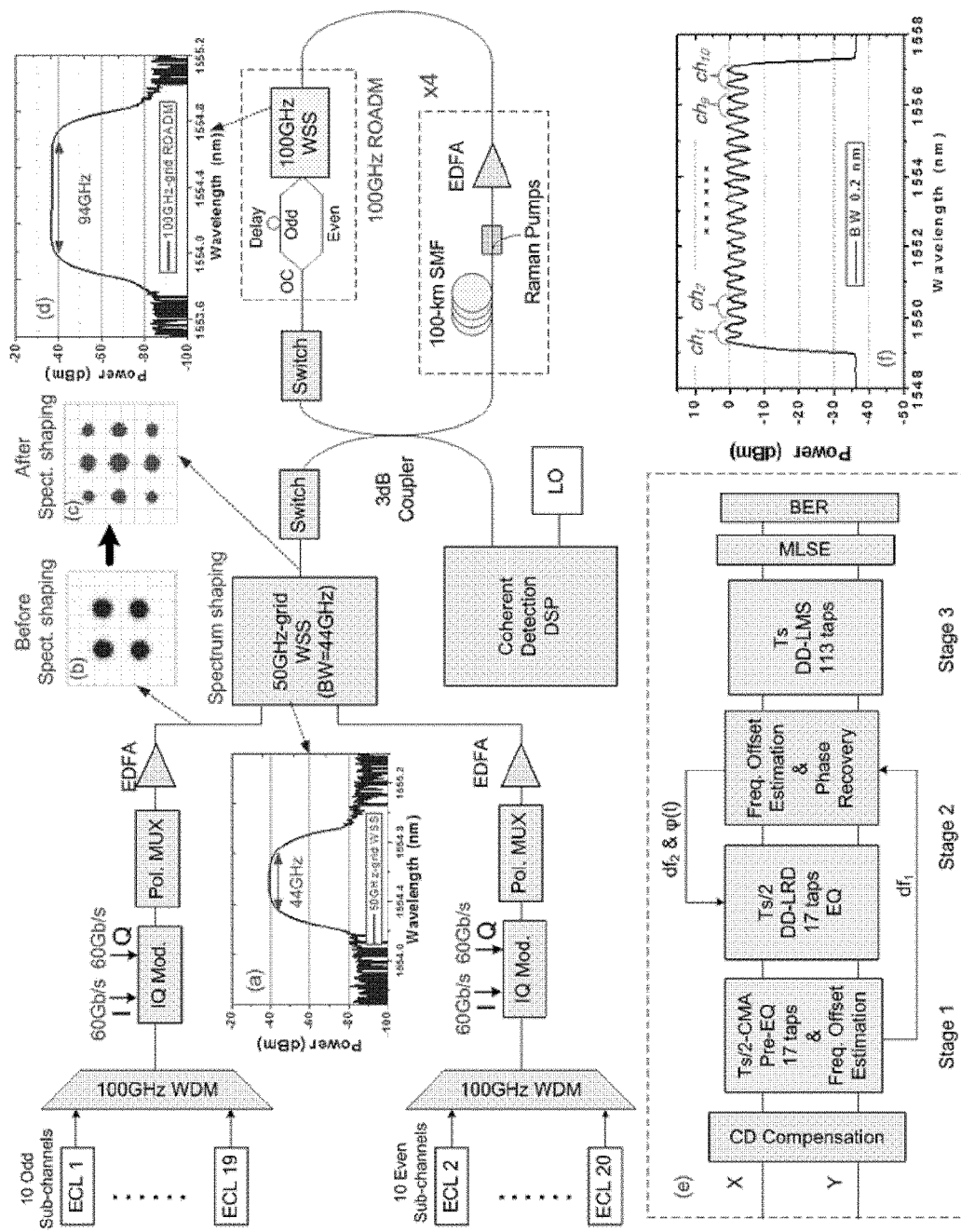
FIG. 12 is an example communication system in which 9-QAM signal processing is performed.

Example embodiments and an experiment setup of 9-QAM-like signals generation by spectrum shaping on QPSK signals are shown in FIG. 12, where 10×480-Gb/s spectrum shaped PDM-9-QAM signals are generated and transmitted over 7200-km SMF-28 and 18 ROADMs at 100-GHz grid. In each 480-Gb/s, 100-GHz-grid super-Nyquist channel, two sub-channels with carrier spacing of 50 GHz are used, each carrying 240-Gb/s. At the transmitter, 20 external cavity lasers (ECLs) with a linewidth less than 100 kHz, spacing of 50 GHz and output power of 14.5 dBm are divided into two groups as the odd and even sub-carriers. The two pairs of 60-Gbaud binary electrical signals are generated from an electrical 4:1 Mux after multiplexing four-channel 15-Gb/s binary signals. Each I/Q modulator (I/Q MOD) driven by two 60-Gb/s pseudo-random binary sequence (PRBS) electrical signals with a word length of 215-1, is used to modulate odd/even sub-carriers. In the depicted embodiment, independent but synchronized I and Q data are used. The polarization multiplexing of each path is realized via the polarization-multiplexer, which consists of a polarization-maintaining optical coupler (PM-OC) to split the signal, an optical delay line (DL1 and DL2) to provide over 100 symbols delay, and a polarization beam combiner (PBC) to recombine the signal. The odd and even channels are spectrally filtered to achieve the 9-QAM-like constellation signals and combined by using a programmable wavelength selective switch (WSS) with 50-GHz fixed grid and 44-GHz 3-dB bandwidth (BW). The measured pass-band transfer function of the 50 GHz-grid WSS is shown in FIG. 12, inset (a). The optical spectrum of 240-Gb/s single sub-channel signals before and after the 50-GHz-grid WSS is shown in FIG. 12, inset (b), where the spectrum-shaped signal occupies a narrower bandwidth. The constellation evolution of PDM-QPSK signal to the 9-QAM-like signal as before and after optical spectrum shaping are shown as FIG. 12, inset (c) and inset (d).

The generated 10×480 Gb/s, 100 GHz-grid channel signals are then launched into a re-circulating transmission loop, which consists of four 100-km spans of conventional SMF-28 fiber with average loss of 21-dB. As shown in FIG. 12, each span of the 100-km SMF is followed by a hybrid post Raman amplifier and EDFA to compensate the fiber loss. The on-off Raman gain is 10 dB per span from ~1450 nm pumps. After 4 spans of 100-km SMF transmission in the loop, the ten 480-Gb/s channels each pass through a 1×10, 100-GHz spaced WSS to emulate the filtering effect from a 100 GHz-grid ROADM. Odd and even channels are then sent to separate WSS output ports, for maximum filtering, and a relative delay of 175 symbols de-correlates the odd and even channels before they are combined in a 3-dB optical coupler. Filtering from the WSS pass-band is measured, as the −3 dB bandwidth of 94-GHz, shown in FIG. 12, inset (e). Thus, the ten channels pass the ROADM after one round trip with 400-km distance and totally 18 ROADMs after 7200-km transmission. FIG. 12, inset (g) shows the back-to-back (b-t-b) optical spectrum of the ten 480-Gb/s, 100-GHz-gird channels with 20 sub-channels from 1549.38 to 1556.94 nm. In this way, the spectrum shaped Nyquist 9-QAM-like signals are transmitted within a narrower bandwidth, which offers much higher tolerance of the filtering effect caused by ROADMs. At the receiver, one tunable optical filter with 3-dB bandwidth of 0.9 nm is employed to select the desired sub-channel. An ECL with a linewidth less than 100 kHz is utilized as local oscillator (LO). A polarization-diverse 90° hybrid is used for polarization- and phase-diversity coherent detection. The sample and digitization (A/D) is realized in the digital scope with 80-GSa/s sample rate and 30-GHz electrical bandwidth.

FIG. 12, inset (f) shows the major DSP functional blocks. A cascaded, 9-QAM based, highly filtering-tolerant three-stage equalization is used for polarization demultiplexing, robust filtering compensation, and other channel distortion mitigation. First, a 17-tap T/2-spaced CMA equalizer is used to perform the pre-equalization. The output of this CMA equalizer is used for the initial frequency-domain frequency offset estimation and compensation. Then, a 17-tap, T/2-spaced 2×2 equalizer as the second stage equalization based on the DD-LRD algorithm are used for polarization demultiplexing. The carrier frequency and phase recovery are performed within the DD-LRD loop. The frequency offset is also estimated and compensated using a frequency-domain method. The phase recovery is realized by decision-directed blind phase search (BPS) method within a small phase-varying range: the initial phase is recovered by the last symbol but then refined using the BPS over a nonlinear distributed phase range. Such a two stage algorithm can effectively mitigate cyclic phase slipping. The phase-recovered signal is then sent to the third stage T-spaced 2×2 equalizer for final optimization, which based on decision-directed least-mean-square (DD-LMS). The final DD-LMS equalizer is with a 113-tap length, where such a long filter is due to the optimal receive filter for a super-Nyquist signal and mitigation of all linear filtering effect along the link. Before the calculation of the bit error ratio (BER), the MLSE based on Viterbi algorithm is utilized for symbol decoding and detection to eliminate the ISI impact. The total errors are counted over $12\times10^6$ bits.

Experiment Results and Discussion

Figure 13:
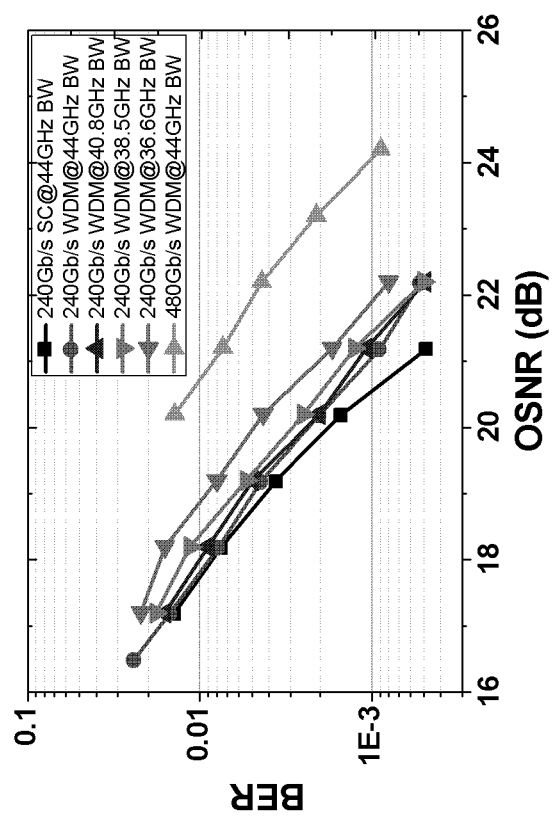
FIG. 13 is a graph depicting an example back to back bit error rate result.
Figure 14:
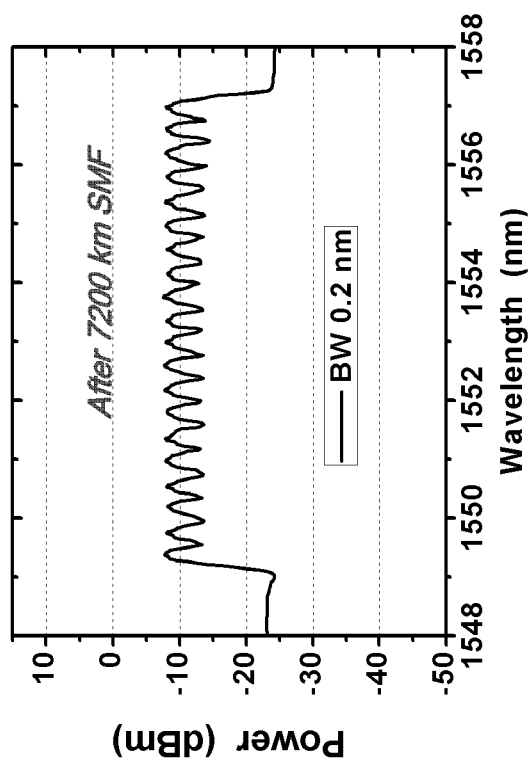
FIG. 14 depicts an example of an optical spectrum after transmission.
Figure 15:
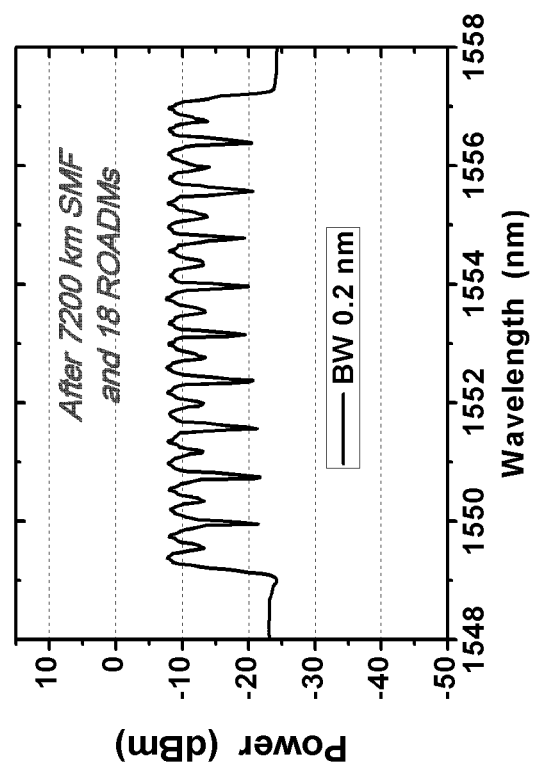
FIG. 15 depicts an example of an optical spectrum after transmission.
Figure 16:
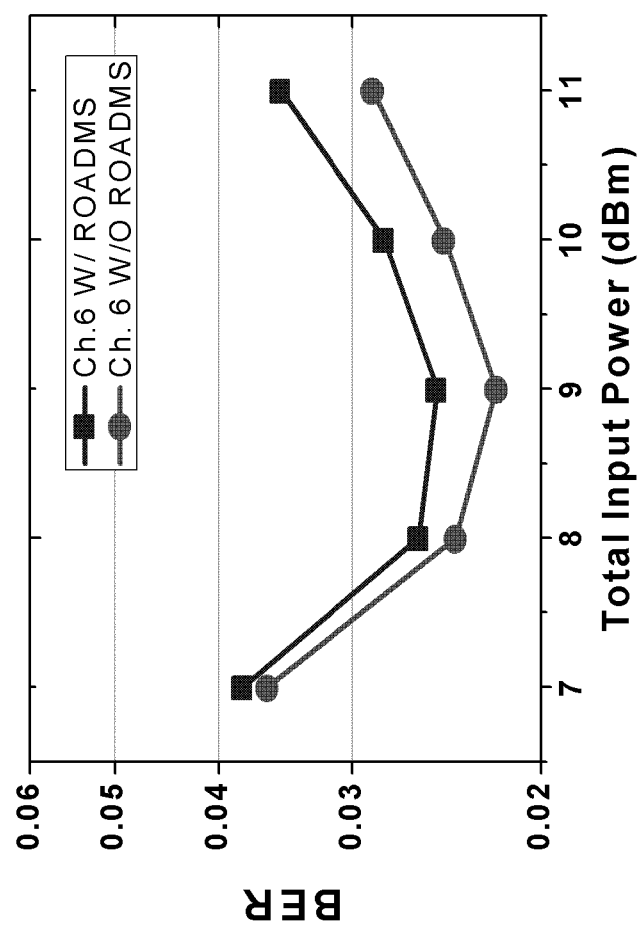
FIG. 16 is a graph depicting an example of an average bit error rate performance.
Figure 17:
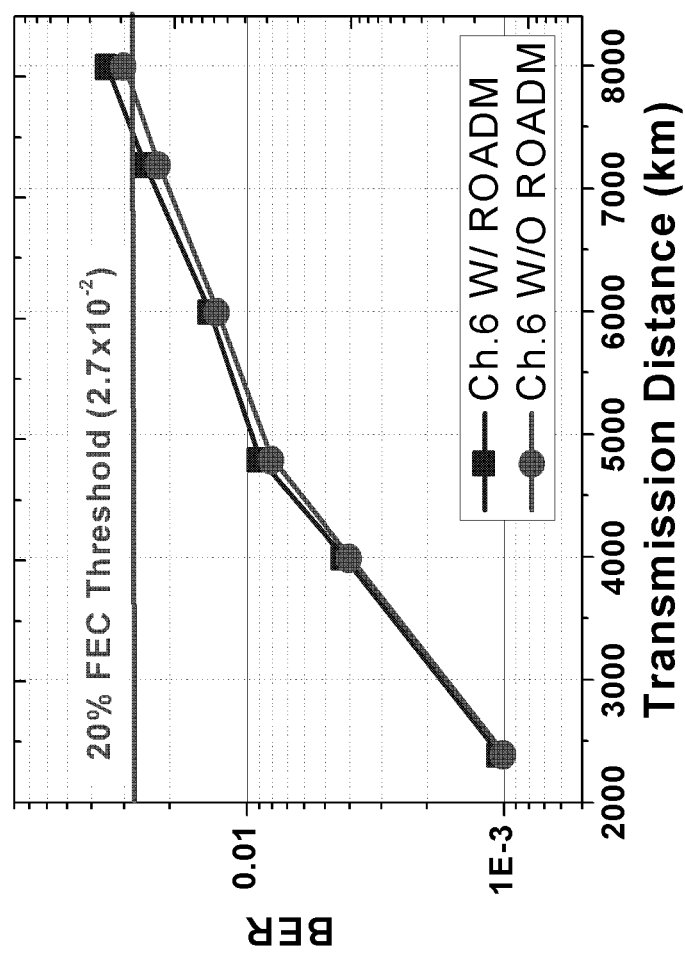
FIG. 17 is a graph depicting measured bit error rate examples.
Figure 18:
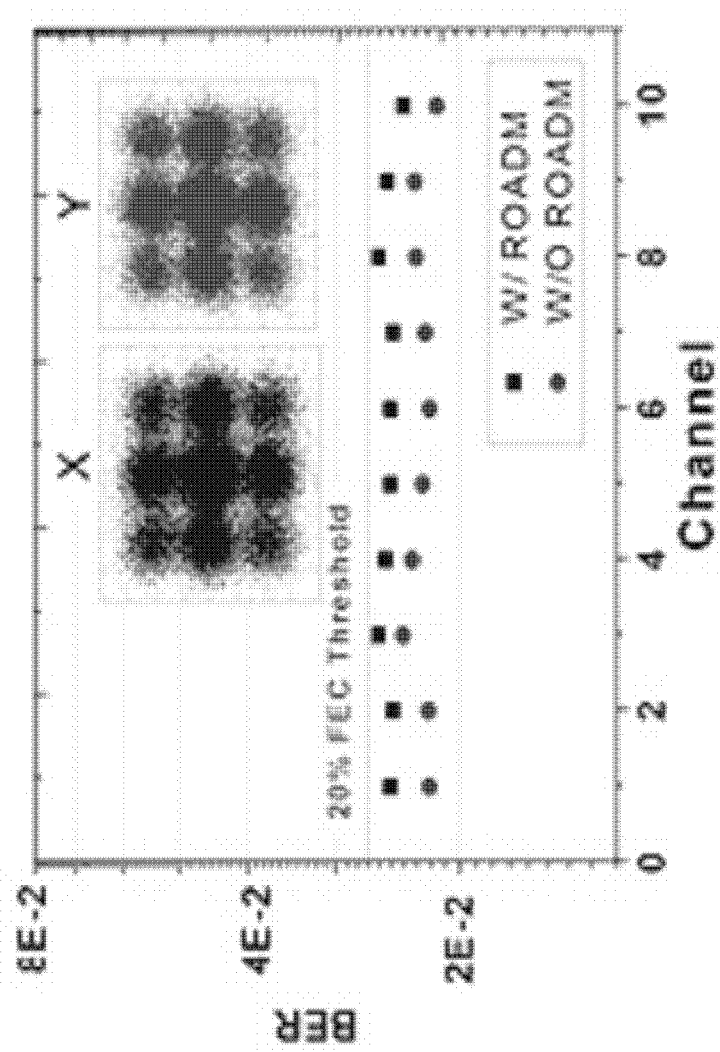
FIG. 18 is a graph depicting measured bit error rate examples.

FIG. 13 shows the b-t-b BER results of 240-Gb/s sub-channel 2 of channel 6 as a function of OSNR (0.1 nm resolution) under different spectrum shaping filter bandwidth. The 3-dB bandwidth of the WSS is changed from 44-GHz to 36.6-GHz. Negligible OSNR penalty for BW larger than 38.8 GHz and less than 1-dB penalty are observed by our proposed robust three-stage equalization process. The required OSNR for that Nyquist WDM 240 Gb/s channel at the BER of $1\times10^{-2}$ is 18-dB/0.1 nm, while 21-dB/0.1 nm for 480-Gb/s channels. In addition, we also verified that all other channels exhibit similar performance except that the side channel has 0.5 dB better OSNR tolerance. The optical spectral after transmission over 72×100-km SMF with and without ROADMs are shown in FIG. 14 and FIG. 15, respectively. Clear filter narrowing effect is observed on the 100-GHz-grid channels. The averaged BER performance of 100-GHz-grid channel 6 after 7200-km transmission by changing the signal power into each span fiber is shown in FIG. 16, where the total input power at 9 dBm provides the best BER performance. FIG. 17 shows the measured BER of the channel 6 with and without ROADMs versus transmission distance ranging from 2000 km to 8000 km. The measured BERs after 7200-km SMF transmission without and with 18 ROADMs are $2.2\times10^{-2}$ and $2.5\times10^{-2}$, respectively. It shows that the three-stage equalization for this super-Nyquist-spectrum-shaped 9-QAM-like signal has a high tolerance of the filter narrowing effect caused by ROADMs. For all channels, the measured BER after transmission with and without ROADMs are shown in FIG. 18 (average of the two sub-channels). After 7200-km transmission, the BER for all super-Nyquist-WDM channels are below the $2.7\times10^{-2}$ BER threshold for 20% soft-decision FEC using LDPC encoding and layered decoding algorithm. The constellations of the received signal in X and Y polarization of channel 6 processed by the filtering-tolerant 9-QAM based three-stage equalization are also inserted in FIG. 18.

It will be appreciated that a highly filtering-tolerant, three-stage equalization for the super-Nyquist PDM QPSK signal based on a 9-QAM-like constellation to achieve 400-Gb/s channels on the 100-GHz grid for ultra-long-haul optical reach is described.

Figure 19:
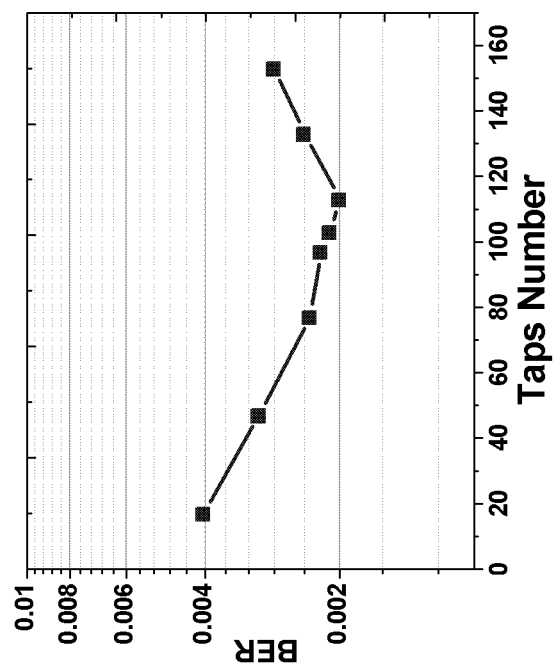
FIG. 19 is a graph depicting an example relationship between bit error rate and number of filter taps used.

In some embodiments, e.g., as described above, the performance can be further improved by using a third stage comprising digital filtering. In some embodiments, the third stage filtering comprises a decision directed least mean square (DD-LMS) filter having a suitable number of filter taps. As depicted in FIG. 19, the number of taps (horizontal axis) can influence the bit error rate (vertical axis) of the results achieved. Depending on the operational objective, various numbers of taps can be used in different embodiments. For example, between 20 to 150 taps may be used to achieve BER at or below 0.004.

Selecting the number of taps used in the third stage filtering to be on the lower side (e.g., between 20 to 60) may provide benefits by reducing computational complexity. However, this reduction in complexity may come at the expense of increased BER performance. Selecting a higher number of taps may provide a better ability to equalize distortions from the channel (e.g., 130 to 150 taps), the improved ability to equalize channel distortions may be at the expense of signal leakage to adjoining channels due to the longer length of the filter. Experiments performed by the inventors have shown that the relationship between the number of taps and BER achieved is "V" or "bowl" shaped, with optimal performance (lowest BER) achieved around 113 to 117 taps.

Figure 20:
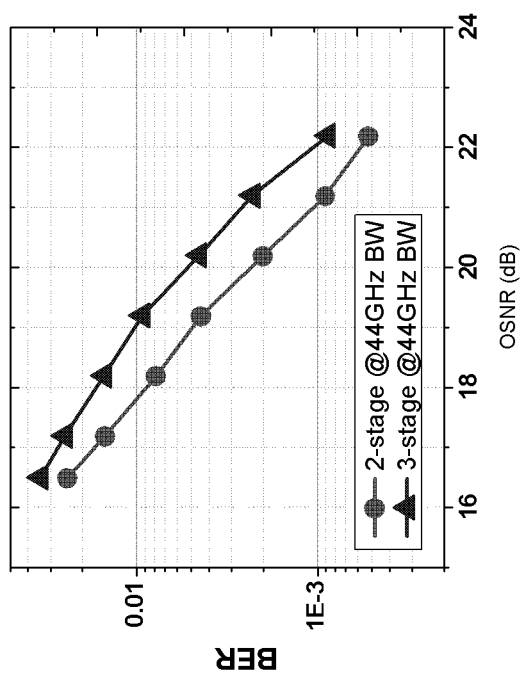
FIG. 20 is a graph comparing performances of two-stage and three-stage filtering techniques.

Referring to FIG. 20, a graph in which performance of the called "two-stage" for convenience of nomenclature, is compared with the "three-stage" technique disclosed in the present document. As can be seen from FIG. 20, the addition of the third stage filter provides an approximately 1 dB improvement in OSNR to achieve a given BER.

The disclosed and other embodiments, modules and the functional operations described in this document (e.g., an optical front end, a timing synchronizer, a signal sampler, a symbol generator and a data recoverer) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. A method of recovering data in an optical communication system, the method comprising:
 receiving an optical signal that is modulated using a quadrature phase shift keying (QPSK) modulation scheme;
 sampling the received optical signal to generate a group of samples comprising samples at time instances that are odd integer multiples of T/2, where T represents a symbol time interval of the QPSK modulation scheme;
 estimating received constellation symbols from the group of samples using a decision-directed least radius distance (DD-LRD) algorithm for blind equalization, wherein the DD-LRD algorithm includes iteratively refining symbol estimates using an adaptive filter;

processing an output of the blind equalization using a decision-directed least-mean-square (DD-LMS) channel equalizer; and recovering data bits transmitted in the optical signal from the estimated constellation symbols.

2. The method of claim 1, wherein the constellation symbols are processed as 9-Quadrature Amplitude Modulation (9-QAM) symbols.

3. The method of claim 1, wherein the optical signal comprises at least two polarized components.

4. The method of claim 1, wherein:
the adaptive filter comprises a finite impulse response (FIR) filter.

5. The method of claim 4, wherein the adaptive filter is refined using a least square error (LSE) optimization criterion.

6. An optical communication receiver, comprising:
an optical front end that receives a polarized modulation quadrature phase shift keying (PM-QPSK) signal;
a timing synchronizer that produces a sampling signal indicative of sampling instances at odd multiples of half of a baud rate of the received PM-QPSK;
a signal sampler that produces sample values of the received PM-QPSK at the sampling instances;
a symbol generator that estimates received symbols from the sample values using a decision directed adaptive filtering method for blind equalization in which decisions about received symbols are iteratively improved using a feedback signal indicative of an error of calculation of previous decisions;
a decision directed least means square (DD-LMS) channel equalizer module that performs a DD-LMS channel equalization on an output of the blind equalization; and
a data recoverer that recovers data bits transmitted in the optical signal from the estimated received symbols.

7. The receiver of claim 6, wherein the symbol generator produces 9-Quadrature Amplitude Modulation (9-QAM) symbols.

8. The receiver of claim 6, wherein:
the adaptive filtering method uses a 9-tap finite impulse response (FIR) adaptive filter.

9. The receiver of claim 8, wherein the adaptive filtering method uses a least square error (LSE) optimization criterion.

10. A computer program product comprising a non-transitory computer-readable medium having code stored thereon, the code, when executed by a processor, causing the processor to implement a method of recovering data in an optical communication system, the method comprising:
receiving an optical signal that is modulated using a quadrature phase shift keying (QPSK) modulation scheme;
sampling the received optical signal to generate a group of samples comprising samples at time instances that are odd integer multiples of T/2, where T represents a symbol time interval of the QPSK modulation scheme;
estimating received constellation symbols from the group of samples using a decision-directed least radius distance (DD-LRD) algorithm for blind equalization, wherein the DD-LRD algorithm includes iteratively refining symbol estimates using an adaptive filter;
processing an output of the blind equalization using a decision-directed least-mean-square (DD-LMS) channel equalizer; and
recovering data bits transmitted in the optical signal from the constellation symbols.

11. The computer program product of claim 10, wherein the constellation symbols are processed as 9-Quadrature Amplitude Modulation (9-QAM) symbols.

12. The computer program product of claim 10, wherein the optical signal comprises at least two polarized components.

13. The computer program product of claim 10, wherein:
the adaptive filter comprises a finite impulse response (FIR) filter.

14. The computer program product of claim 13, wherein the adaptive filter is refined using a least square error (LSE) optimization criterion.

15. The computer program product of claim 10, wherein the constellation symbols are processed as 9-Quadrature Amplitude Modulation (9-QAM) symbols.

16. The computer program product of claim 10, wherein the optical signal comprises at least two polarized components.

17. The computer program product of claim 10, wherein the adaptive filter comprises a finite impulse response (FIR) filter.

18. The computer program product of claim 17, wherein the adaptive filter is refined using a least square error (LSE) optimization criterion.

* * * * *